(12) United States Patent
Tetzlaff

(10) Patent No.: US 12,733,575 B1
(45) Date of Patent: Sep. 15, 2026

(54) HEADS FOR STRING TRIMMERS AND MOWERS

(71) Applicant: ARDISAM, INC., Cumberland, WI (US)

(72) Inventor: Tyler Michael Tetzlaff, Frederic, WI (US)

(73) Assignee: ARDISAM, INC., Cumberland, WI (US)

( * ) Notice: Subject to any disclaimer, the term of this patent is extended or adjusted under 35 U.S.C. 154(b) by 0 days.

(21) Appl. No.: 19/355,980

(22) Filed: Oct. 10, 2025

(51) Int. Cl.
*A01D 34/416* (2006.01)
*A01D 101/00* (2006.01)

(52) U.S. Cl.
CPC ...... *A01D 34/4165* (2013.01); *A01D 2101/00* (2013.01)

(58) Field of Classification Search
CPC ........................ A01D 34/4165; A01D 2101/00
See application file for complete search history.

(56) References Cited

U.S. PATENT DOCUMENTS 4,086,700 A 5/1978 Inada
4,190,954 A * 3/1980 Walto ................ A01D 34/4166 56/12.7
4,229,882 A * 10/1980 Chartier ............... A01D 34/416 30/276
4,685,279 A 8/1987 Gullett
4,756,146 A 7/1988 Rouse
4,905,465 A 3/1990 Jones et al.
5,023,998 A * 6/1991 Masciarella ....... A01D 34/4166 30/276
5,048,278 A 9/1991 Jones et al.
5,170,561 A 12/1992 Sepke
(Continued)

FOREIGN PATENT DOCUMENTS

BR MU8802134 U2 8/2009
EP 2255407 B1 6/2011
(Continued)

OTHER PUBLICATIONS

Craftsman Hassle-Free III Trimmer Line, retrieved Oct. 16, 2025, URL: https://www.amazon.sg/Craftsman-Hassle-Free-Trimmer-Line-71-85740/dp/B003B3XBY0.
(Continued)

*Primary Examiner* — Arpad Fabian-Kovacs
(74) *Attorney, Agent, or Firm* — ASHURST PERKINS COIE US LLP

(57) ABSTRACT

A rotatable cutting head body for holding a cutting line for a string trimmer or mower includes a plurality of passageways, with each passageway extending between two openings at the perimeter of the cutting head body. A cutting line may be installed in the passageways to extend into inlet openings and out from outlet openings, with free ends of the cutting line extending in radially opposite directions away from a rotational axis of the cutting head body. The passageways may be coplanar with each other. The cutting head body may include one or more cutting head disks arranged along the axis, with each disk having the plurality of passageways. The cutting head body may not include moving parts for advancing the cutting line. The cutting head disks may position the cutting line away from an interface between two adjacent cutting head disks.

30 Claims, 10 Drawing Sheets

(56) References Cited

U.S. PATENT DOCUMENTS

| | | | | |
|---|---|---|---|---|
| 5,303,476 | A | 4/1994 | Tuggle | |
| 5,433,006 | A * | 7/1995 | Taguchi | A01D 34/416 30/276 |
| 6,035,618 | A | 3/2000 | Fogle | |
| 6,052,974 | A * | 4/2000 | Harb | A01D 34/416 30/329 |
| 6,094,823 | A | 8/2000 | Brown et al. | |
| 6,176,015 | B1 | 1/2001 | Morabit et al. | |
| 6,314,848 | B2 | 11/2001 | Morabit et al. | |
| 6,363,616 | B1 | 4/2002 | Kreissle | |
| 6,983,543 | B2 | 1/2006 | Fogle | |
| 7,587,828 | B2 | 9/2009 | Legrand | |
| 8,001,694 | B2 | 8/2011 | Sing et al. | |
| 8,745,879 | B2 | 6/2014 | Alliss | |
| 8,910,387 | B2 | 12/2014 | Alliss | |
| 10,631,458 | B2 | 4/2020 | Morabit | |
| D1,002,307 | S * | 10/2023 | Morabit | D8/8 |
| D1,015,094 | S * | 2/2024 | Morabit | D8/8 |
| 11,968,924 | B2 * | 4/2024 | Ruppel | A01D 34/84 |
| 2001/0003935 | A1 * | 6/2001 | Morabit | B29C 53/14 83/13 |
| 2004/0103543 | A1 | 6/2004 | Fogle | |
| 2004/0128840 | A1 | 7/2004 | Proulx et al. | |
| 2006/0048396 | A1 | 3/2006 | Legrand | |
| 2006/0191143 | A1 | 8/2006 | Brandon | |
| 2012/0066912 | A1 * | 3/2012 | Ferrell | A01D 34/4166 30/276 |
| 2015/0264862 | A1 | 9/2015 | Skinner | |
| 2016/0143220 | A1 | 5/2016 | Child | |
| 2017/0208739 | A1 * | 7/2017 | Arnetoli | A01D 34/4166 |
| 2017/0303468 | A1 | 10/2017 | Nolin et al. | |
| 2018/0116120 | A1 | 5/2018 | Reiter | |
| 2018/0368315 | A1 | 12/2018 | Jones et al. | |
| 2020/0045881 | A1 | 2/2020 | Cigarini | |
| 2020/0060080 | A1 | 2/2020 | Nevels | |
| 2020/0253117 | A1 | 8/2020 | Guerra | |
| 2020/0329636 | A1 | 10/2020 | Chang | |
| 2021/0321561 | A1 | 10/2021 | Ruppel et al. | |
| 2024/0334870 | A1 * | 10/2024 | Morabit | A01D 34/4168 |

FOREIGN PATENT DOCUMENTS

| | | | |
|---|---|---|---|
| EP | 2974586 | B1 | 9/2017 |
| JP | 2005168452 | A | 6/2005 |
| WO | 2021216381 | A1 | 10/2021 |

OTHER PUBLICATIONS

Earthquake Walk Behind String Mower 163cc Briggs engine, retrieved Oct. 16, 2025, URL: https://www.getearthquake.com/products/walk-behind-string-mower.

Ryobi One+ 18V cordless Battery String Trimmer, retrieved Oct. 16, 2025, URL: https://www.homedepot.com/p/RYOBI-ONE-18V-13-in-Cordless-Battery-String-Trimmer-Tool-Only-P20015BTL/315685813.

Ryobi Reel Easy+ Bump Feed Trimmer Head, retrieved Oct. 16, 2025, URL: https://www.homedepot.com/p/RYOBI-REEL-EASY-Bump-Feed-String-Head-with-Speed-Winder-AC053N1BFH/311264918.

Earthquake, "28463 M205 Trimmer with 150cc 4-Cycle Viper Engine Walk Behind String Mower", URL: https://www.amazon.com/Earthquake-28463-String-Mower-Black/dp/B0757TSK3N, website visited Jan. 9, 2021.

Husqvarna, "Straight Shaft String Trimmer", URL: https://www.northerntool.com/shop/tools/product_200700335_200700335; website visited Jan. 9, 2021.

Pivotrim, "Trimmer Head", URL: https://www.simplygoodstuff.com/pivotrim.html, website visited Jan. 9, 2021.

USPTO (ISA/US), "Invitation to Pay Additional Fees", for PCT/US21/27824, Jun. 24, 2021.

USPTO/ISA, "International Search Report and Written Opinion", Application No. PCT/US21/27824, Aug. 23, 2021.

* cited by examiner 605
640
630
H
615
630
640
600

125b
420
125
630
630
440
H
605
S
645
220c
645
125

HEADS FOR STRING TRIMMERS AND MOWERS

BACKGROUND

A typical string trimmer or mower includes a cutting head that holds a cutting line (sometimes called a cord or a string, which may generally be a strand of plastic, such as nylon, or metal). The cutting head is rotated to swing the cutting line at a high speed to cut weeds, grass, or other materials. Conventional cutting heads suffer from several disadvantages. For example, conventional cutting heads may include several mechanical components, which increases manufacturing cost and complexity. Complex internal mechanisms for advancing cutting lines may be prone to malfunction. Conventional cutting heads may also require a complicated loading procedure for installation of the cutting line into the head. Further, conventional cutting heads may hold the cutting line in a manner that makes its removal difficult, especially when dirt or debris obstructs the cutting line. Cutting lines in conventional cutting heads may also become friction-welded together due to rubbing at high speeds, further complicating removal of the lines. Additionally, conventional cutting heads may collect debris around the head itself (sometimes called "weed wrap"), which may cause the trimmer or mower to bind, causing malfunction or damage.

SUMMARY

The present technology relates to heads for string trimmers and mowers, or for other machines (e.g., agricultural machines), and associated systems and methods. In some embodiments, a cutting head body for holding a cutting line includes a plurality of passageways, with each passageway extending between two openings at the perimeter of the cutting head body. A cutting line may be installed in the passageways to extend into inlet openings and out from outlet openings, with the free ends of the cutting line extending in radially opposite directions away from a rotational axis of the cutting head body. The passageways may be coplanar with each other. The cutting head body may include one or more cutting head disks arranged along the axis, with each disk having the plurality of passageways. The cutting head body may not include moving parts for advancing the cutting line. The cutting line may or may not have a node (e.g., knot) along its length. The cutting head disks may position the cutting line away from an interface between two adjacent cutting head disks Other features and advantages will appear hereinafter. The features described herein can be used separately or together, or in various combinations of one or more of them.

BRIEF DESCRIPTION OF THE DRAWINGS

In the drawings and description, the same reference number indicates the same element throughout the views and description.

DETAILED DESCRIPTION

Figure 1A:
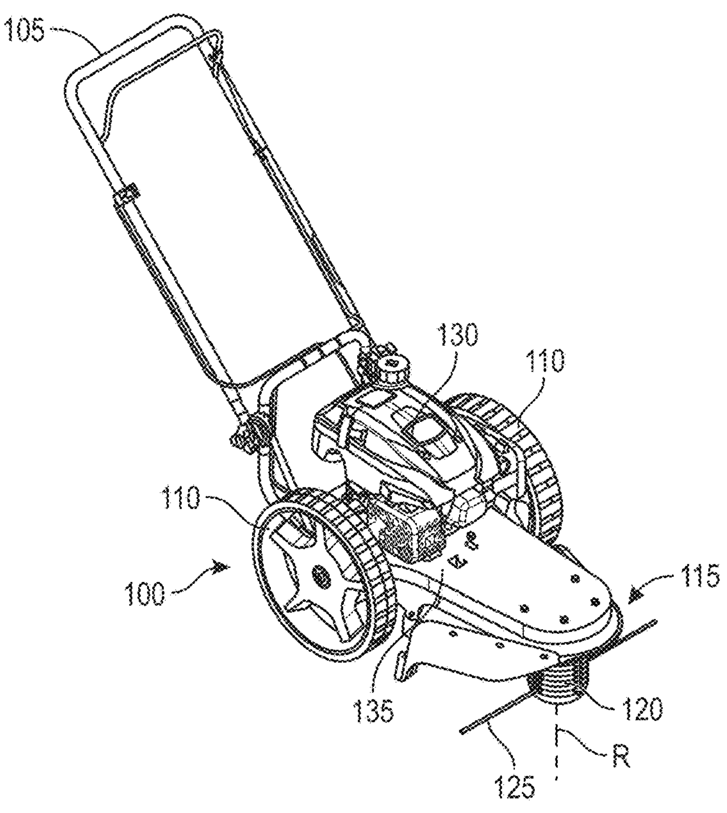
FIG. 1A illustrates a schematic perspective view of an agricultural machine for cutting weeds, grass, or other materials (e.g., a "string trimmer" or "string mower"), configured in accordance with embodiments of the present technology.

The present technology is directed to heads for string trimmers and mowers, or for other machines (e.g., other agricultural machines), and associated systems and methods. The following description provides specific details for a thorough understanding and enabling description of embodiments of the present technology. One skilled in the art will understand, however, that the invention may be practiced without many of these details. Additionally, some well-known structures or functions, such as structures or functions common to trimmers, mowers, engines, or transmissions, may not be shown or described in detail to avoid unnecessarily obscuring the relevant description of the various embodiments. Accordingly, embodiments of the present technology may include additional elements or exclude some of the elements described below with reference to FIGS. 1A-6D, which illustrate examples of the technology.

The terminology used in the description presented below is intended to be interpreted in its broadest reasonable manner, even though it is being used in conjunction with a detailed description of certain specific embodiments of the invention. Certain terms may be emphasized below; however, any terminology intended to be interpreted in any restricted manner will be overtly and specifically defined as such in this detailed description section.

Where the context permits, singular or plural terms may also include the plural or singular term, respectively. Unless the word "or" is expressly limited to mean only a single item exclusive from the other items in a list of two or more items, the use of "or" in such a list is to be interpreted as including (a) any single item in the list, (b) all of the items in the list, or (c) any combination of items in the list.

Further, unless otherwise specified, terms such as "attached" or "connected" are intended to include integral connections, as well as connections between physically separate components. Numerical adjectives such as “first” and “second,” as used in the present disclosure, do not convey hierarchy or specific features or functions. Rather, such numerical adjectives are intended to aid the reader in distinguishing between elements which may have similar nomenclature, but which may differ in position, orientation, or structure. Accordingly, such numerical adjectives may be used differently in the claims. The components in the drawings are not necessarily drawn to scale.

FIG. 1A illustrates a schematic perspective view of an agricultural machine 100 for cutting weeds, grass, or other materials (e.g., a “string trimmer” or “string mower”), configured in accordance with embodiments of the present technology. The agricultural machine 100 may include a handle 105 for pushing the machine 100, one or more wheels 110 for supporting the machine 100 while traversing the ground (or other means for supporting the machine 100 while traversing the ground, such as tracks or skids), a cutting head assembly 115 including a cutting head body 120 configured to receive, hold, and spin a cutting line 125 when rotational force is applied to the cutting head body 120, an engine 130 for providing rotational force to rotate the cutting head body 120 (e.g., about a rotational axis R), and other components suitable for operating the machine 100, such as controls for the engine 130, or relevant support structure 135 (e.g., a body). In some embodiments, the engine 130 may be a fuel-powered engine, such as a gasoline-powered engine. The engine 130 may be connected to the cutting head body 120 via a suitable transmission (not shown) for transmitting rotational force from the engine 130 to the cutting head body 120.

Figure 1B:
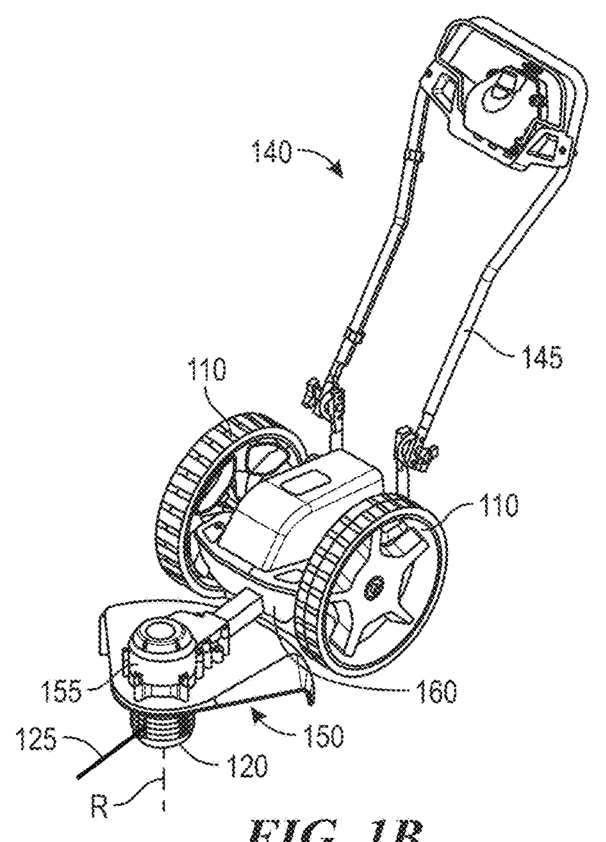
FIG. 1B illustrates a schematic perspective view of an agricultural machine like the agricultural machine shown in FIG. 1A and configured in accordance with additional embodiments of the present technology.

FIG. 1B illustrates a schematic perspective view of a similar agricultural machine 140, configured in accordance with additional embodiments of the present technology. The agricultural machine 140 may be similar to the agricultural machine 100 described above with regard to FIG. 1A, e.g., it may have a handle 145, one or more wheels 110 (or other means for supporting the machine 140), and a cutting head assembly 150. The cutting head assembly 150 may include the cutting head body 120. The machine 140 may further include an electric motor 155 for providing rotational force to rotate the cutting head body 120, and other components suitable for operating the machine 140, such as controls for the electric motor 155 or relevant support structure 160 (e.g., a body). Embodiments of the present technology may include other machines that include the cutting head body 120, whether powered by fuel, electricity, or other means for rotating the cutting head body 120 about the rotational axis R.

Figure 2:
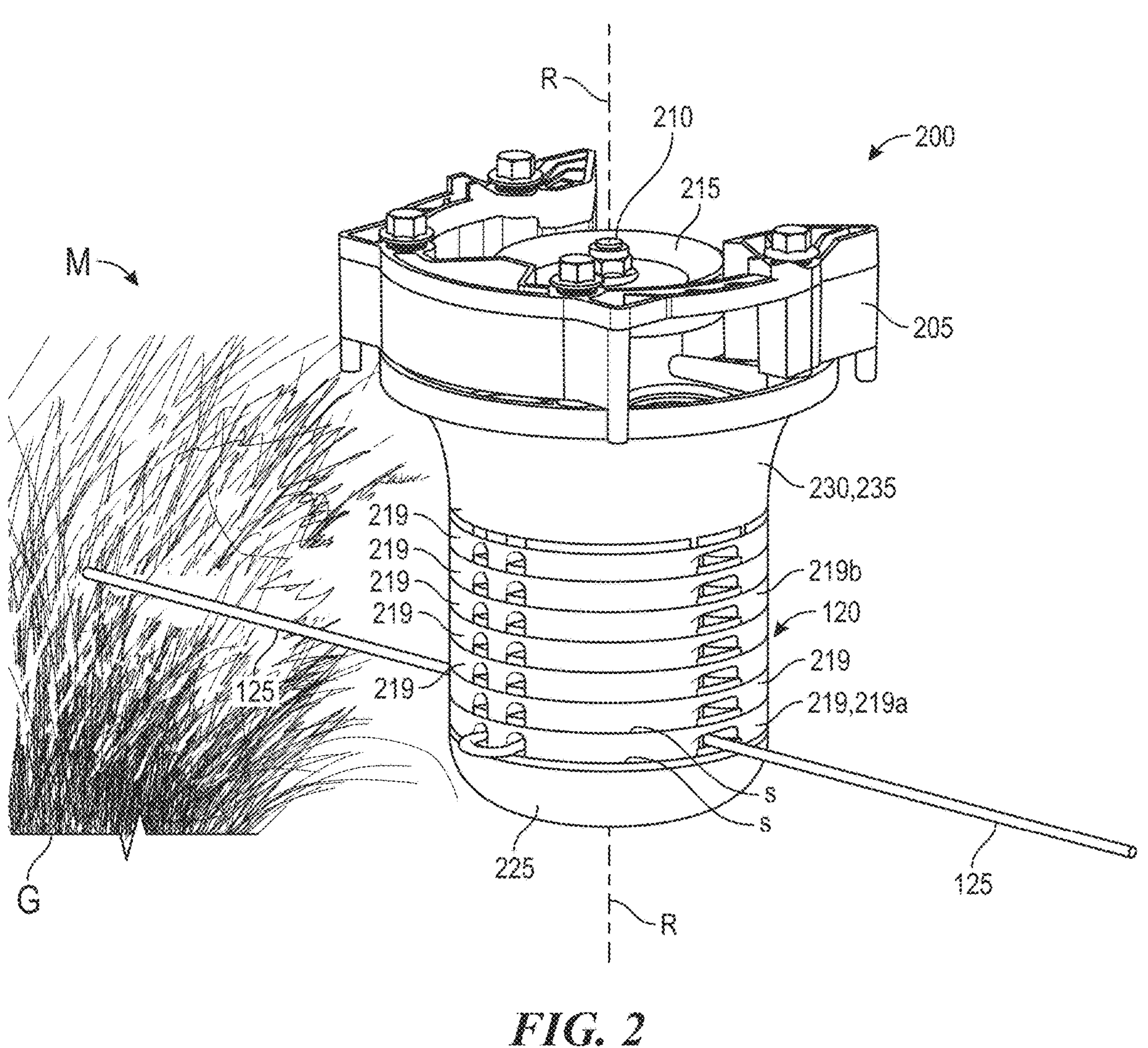
FIG. 2 illustrates a schematic perspective view of several components of a cutting head assembly configured in accordance with embodiments of the present technology, and suitable for implementation in the agricultural machines shown in FIG. 1A or FIG. 1B.

FIG. 2 illustrates a schematic perspective view of several components of a cutting head assembly 200 configured in accordance with embodiments of the present technology. In some embodiments, the cutting head assembly 200 is implemented in a machine, such as the agricultural machine 100 described above with regard to FIG. 1A. In other embodiments, one or more aspects of the cutting head assembly 200 may be implemented in the agricultural machine 140 described above in the context of FIG. 1B. The cutting head assembly 200 may include a support structure 205 supporting a driveshaft 210 and the cutting head body 120. The support structure 205 may be carried by, or attached to, a support structure of an agricultural machine (e.g., the support structures 135, 160 described above). The driveshaft 210 may be operably connected to a source of rotational force, such as the engine 130 or the electric motor 155, via one or more optional transmission systems (e.g., a pulley 215 shown in FIG. 2). The driveshaft 210 extends along the rotational axis R. The cutting head body 120 is engaged to the driveshaft 210 such that rotating the driveshaft 210 causes rotation of the cutting head body 120 about the rotational axis R to swing or sweep the cutting line 125 through material M to be cut.

In some embodiments, the cutting head body 120 includes one or more cutting head disks 219. The one or more cutting head disks 219 may be positioned between a domed bottom cover 225 and an upper portion 230 of the cutting head body 120, or between the domed bottom cover 225 and the pulley 215 (or a gear, if a gear is implemented instead of a pulley). The upper portion 230 may optionally be in the form of a weed wrap sleeve 235, which may have a round tapered shape between a wider diameter adjacent to the support structure 205 (or otherwise at a top portion of the cutting head body 120) and a smaller diameter adjacent to the one or more cutting head disks 219 (e.g., the outer surface of the weed wrap sleeve 235 may diverge radially outwardly relative to the rotational axis R from a lower location to a higher location). The weed wrap sleeve 235 may resist or prevent “weed wrap” when the cutting head body engages tall material to be cut.

FIG. 2 shows seven example cutting head disks 219, but any suitable number of cutting head disks 219 may be included in a cutting head body 120 according to various embodiments (e.g., one or more). A user may set a cutting height by installing the cutting line 125 in a selected cutting head disk 219 corresponding to the desired cutting level. For example, a cutting line 125 in the lowest cutting head disk 219*a* provides a lower cutting height (e.g., shorter grass) than a cutting line 125 in a higher cutting head disk 219*b* when the user is positioning the domed bottom cover 225 against the ground surface G. In some embodiments, the cutting head disks 219 may be separable elements arranged (e.g., stacked) along the rotational axis R.

Figure 3:
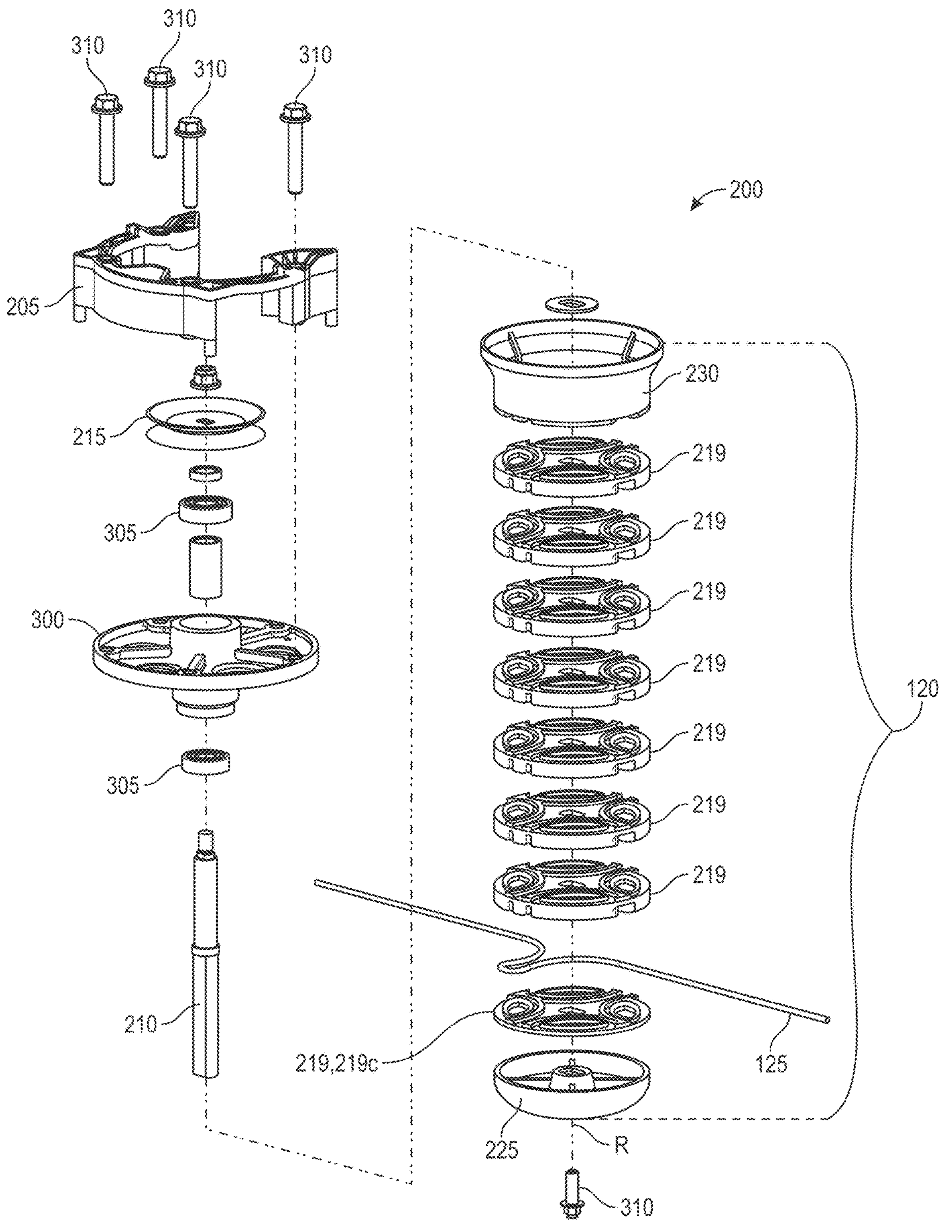
FIG. 3 illustrates an exploded schematic perspective view of the cutting head assembly shown in FIG. 2.

FIG. 3 illustrates an exploded schematic perspective view of the cutting head assembly 200 shown in FIG. 2. For purposes of the present disclosure, it is not necessary to describe each component shown in FIG. 3 in detail. For example, the support structure 205, the pulley 215, a housing 300, and suitable bearings 305 and fasteners 310 for holding various components together in fixed or rotatable arrangements for rotating the driveshaft 210 and the cutting head body 120, are easily understood by viewing FIG. 3. In some embodiments that include more than one cutting head disk 219, some or all the cutting head disks 219 may be identical to each other. In other embodiments, some or all the cutting head disks 219 may be different from the other cutting head disks 219. In general, the cutting head body 120 may include one or more cutting head disks 219 arranged along the rotational axis R (e.g., the one or more cutting head disks 219 may be stackable and nestable around and along the rotational axis R or around and along the driveshaft 210).

Figure 4A:
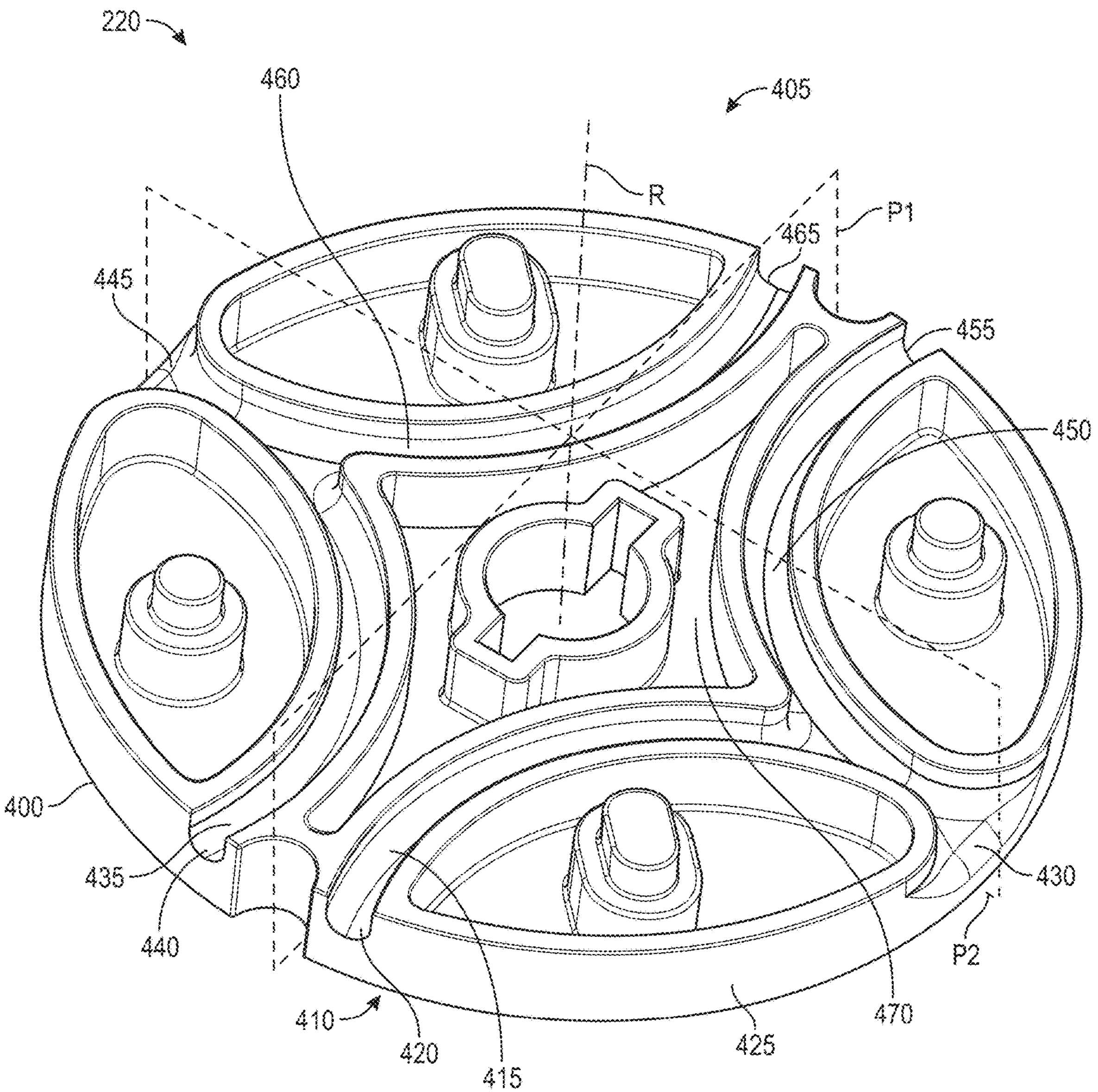
FIG. 4A illustrates a perspective view of a first side of a cutting head disk configured in accordance with embodiments of the present technology.

FIG. 4A illustrates a perspective view of a first side of a cutting head disk 220 configured in accordance with embodiments of the present technology. In some embodiments, one or more of the cutting head disks 219 described above in the context of FIGS. 2 and 3 may be the cutting head disk 220 described in connection with FIG. 4A.

In some embodiments, the cutting head disk 220 includes a base portion 400 defining the first side 405 (e.g., a top side) and a second side 410 (e.g., a bottom side) opposite the first side 405. The cutting head disk 220 may include a first passageway 415 along the first side 405 for receiving a part of the cutting line 125. The first passageway 415 may extend from a first opening 420 at a perimeter 425 of the cutting head disk 220, then toward the axis R, then the first passageway 415 may diverge (e.g., bend or curve) away from the axis R toward a second opening 430 at the perimeter 425 of the cutting head disk 220. The cutting head disk 220 may further include a second passageway 435 along the first side 405. The second passageway 435 may extend from a third opening 440 at the perimeter 425 of the cutting head disk 220, then toward the axis R, then the second passageway 435 may diverge (e.g., bend or curve) away from the axis R and away from the second opening 430, toward a fourth opening 445 at the perimeter 425.

The fourth opening 445 may be opposite the second opening 430 relative to the axis R (e.g., 180 degrees away along an imaginary circular arc centered around the axis R). The third opening 440 may be symmetrically opposed to the first opening 420 relative to a first imaginary plane P1 containing the axis R (e.g., a vertical plane bisecting the cutting head disk 220 and positioned between the first opening 420 and the third opening 440). In some embodiments, the second opening 430 may be positioned less than 90 degrees away from the first opening 420 about an imaginary circular arc centered around the axis R.

In some embodiments, the cutting head disk 220 may further include another pair of passageways symmetrically opposed to the first passageway 415 and the second passageway 435. For example, the cutting head disk 220 may include a third passageway 450 along the first side 405. The third passageway 450 may extend from a fifth opening 455 at the perimeter 425 of the cutting head disk 220, then toward the axis R, then the third passageway 450 may diverge (e.g., bend or curve) away from the axis R toward the second opening 430. The fifth opening 455 may be symmetrically opposed to the first opening 420 relative to a second imaginary plane P2 containing the axis R (the second plane P2 is perpendicular to the first plane P1 and bisects the cutting head disk 220 through the second opening 430).

The cutting head disk 220 may further include a fourth passageway 460 along the first side 405. The fourth passageway 460 may extend from a sixth opening 465 at the perimeter 425 of the cutting head disk 220, then toward the axis R, then the fourth passageway 460 may diverge (e.g., bend or curve) away from the axis R and away from the second opening 430, toward the fourth opening 445. The sixth opening 465 may be symmetrically opposed to the fifth opening 455 relative to the first plane P1. The sixth opening 465 may be 180 degrees away from the first opening 420 about the axis R. Some or all the passageways 415, 435, 450, 460 may be coplanar with each other (e.g., in a plane that is orthogonal to the axis R).

The first passageway 415 and the third passageway 450 are described above and illustrated in FIG. 4A as sharing the second opening 430, and the second passageway 435 is described above and illustrated in FIG. 4A as sharing the fourth opening 445 with the fourth passageway 460. In such an arrangement, as described below in connection with FIG. 4C, the cutting line 125 may extend away from the axis R radially or nearly radially, which facilitates balancing of the cutting head disk 220 and cutting head body 120 during operation of the machine 100. In some embodiments, the second opening 430 or the fourth opening 445 may each be made as two separate openings (e.g., one for each corresponding passageway).

Passageways configured in accordance with embodiments of the present technology may be described or characterized in other ways. For example, in some embodiments, the first passageway 415 may extend from the perimeter 425 of the cutting head disk 220, toward a radially inward portion 470 of the cutting head disk 220 (e.g., a portion of the cutting head disk 220 that generally surrounds the axis R), then the first passageway 415 may diverge (e.g., bend or curve) away from the radially inward portion 470 toward the perimeter 425 of the cutting head disk 220. The second passageway 435 may extend from the perimeter 425, toward the radially inward portion 470, then the second passageway 435 may diverge away from the radially inward portion 470 and toward the perimeter 425. The second passageway 435 may be symmetrically opposed to the first passageway 415 relative to the first plane P1. The third passageway 450 may be symmetrically opposed to the first passageway 415 relative to the second plane P2 (e.g., the third passageway 450 may have reflective symmetry with the first passageway 415). The fourth passageway 460 may be symmetrically opposed to the third passageway 450 relative to the first plane P1 and symmetrically opposed to the second passageway 435 relative to the second plane P2 (e.g., the fourth passageway 460 may have reflective symmetry with the second passageway 435).

In some embodiments, the third passageway 450 together with the fourth passageway 460 may form a mirror image of the first passageway 415 together with the second passageway 435 across the second plane P2. In some embodiments, the cutting head disk 220 may have a plurality of passageways (e.g., the first, second, third, and fourth passageways 415, 435, 450, 460), each extending between two end locations at the perimeter 425 (e.g., the corresponding openings described above) and bending or curving inwardly (e.g., toward the axis R or the radially inward portion 470) between their two end locations (e.g., the openings). In some embodiments, the cutting head disk 220 may be formed by four quadrants defined by the first and second planes P1, P2, each having a passageway and being a mirror image or generally a mirror image of an adjacent quadrant across the corresponding plane (P1 or P2) between the quadrant and the adjacent quadrant.

Figure 4B:
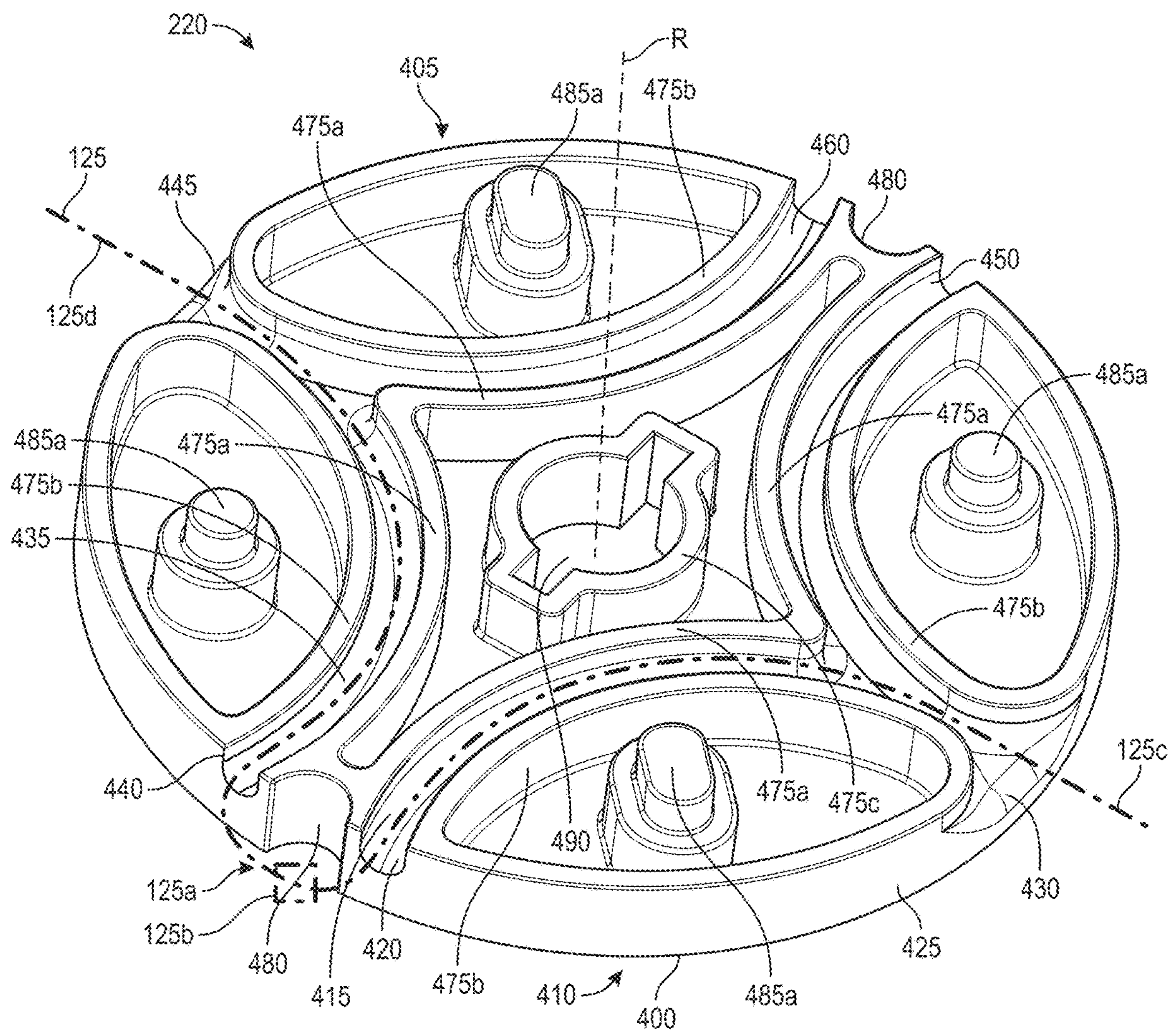
FIG. 4B illustrates the perspective view of the cutting head disk shown in FIG. 4A, but with a cutting line illustrated as being installed in two of the passageways in or on the cutting head disk.

FIG. 4B illustrates the perspective view of the first side 405 of the cutting head disk 220 shown in FIG. 4A, but with a cutting line 125 schematically illustrated in two of the passageways 415, 435. In some embodiments, one or more, or all of the passageways 415, 435, 450, 460, may be defined by walls 475 extending from the first side 405 of the cutting head disk 220, along a direction away from the second side 410 (e.g., perpendicular to the plane orthogonal to the axis R). The walls 475 may form sides of the passageways. For example, the walls 475 may include interior walls 475*a* (e.g., four interior walls 475*a*, which may be separate from each other in some embodiments, or continuous with each other in some embodiments and deemed a single interior wall 475*a*). The interior wall(s) 475*a* may be diamond-shaped with each side (each wall 475*a*) diverging (e.g., curving or bending) inwardly away from the perimeter 425. In some embodiments, the walls 475 may include one or more outward walls 475*b* (e.g., four outward walls 475*b*) that are spaced apart from the interior walls 475*a* by each corresponding passageway 415, 435, 450, 460. At least portions of the outward walls 475*b* may be parallel to the adjacent portions of the interior walls 475*a*. The walls 475 may have a depth that generally corresponds to a thickness of the cutting line 125, such that the passageways 415, 435, 450, 460 are configured to receive the cutting line 125.

The cutting line 125 may be installed through the first passageway 415 and the second passageway 435, or through the third passageway 450 and the fourth passageway 460 (not shown in FIG. 4B), or two cutting lines 125 may be installed using all the passageways 415, 435, 450, 460. In some embodiments, a middle portion 125*a* of the cutting line 125 may include a node, knot, or other projection or inconsistency 125*b*, which may aid in keeping the cutting line 125 from being pulled out of the cutting head disk 220 through the second opening 430 and the fourth opening 445. In other embodiments, the cutting line 125 may omit such a node or inconsistency 125*b*, or it may be generally straight and continuous before installation in the cutting head disk 220.

The first opening 420 and the third opening 440 may be considered inlet openings for receiving corresponding ends 125*c*, 125*d* of the cutting line 125, which are then pushed or pulled through the corresponding passageways 415, 435 until the ends 125*c*, 125*d* extend out of the second opening 430 and the fourth opening 445, which may be deemed outlet openings. In some embodiments, the cutting head disk 220 may include one or more notches 480 in the perimeter 425 for receiving at least a portion of the inconsistency 125*b*, with each notch positioned between the inlet openings. Each notch 480 may form a space for a user's fingers to grasp the cutting line 125 when a user needs to remove the cutting line 125.

The passageways 415, 435, 450, 460 are defined spaces that receive and guide the cutting line 125 through the cutting head disk 220 or the cutting head body 120 so the cutting line 125 may be held in the cutting head body 120 with ends of the cutting line 125 (ends 125*c*, 125*d*) extending and protruding generally radially outwardly in position for cutting. The ends of the cutting line 125 may extend perpendicularly relative to the face of the perimeter 425. An adjacent cutting head disk 220 or other cover element may be positioned to cover the passageways 415, 435, 450, 460 in the cutting head body 120 (see, e.g., FIG. 2).

Figure 4C:
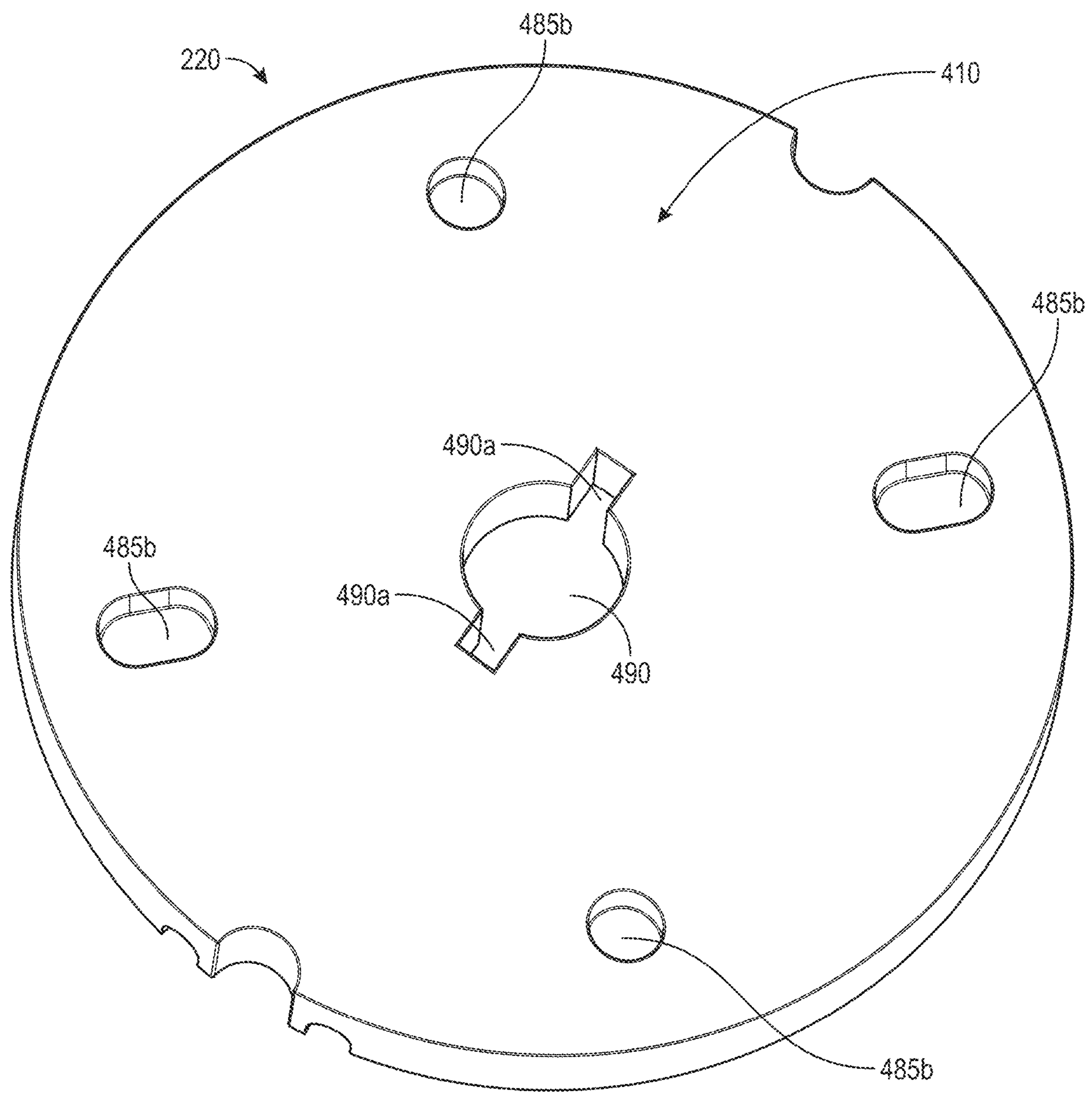
FIG. 4C illustrates a perspective view of a second side of the cutting head disk shown in FIGS. 4A and 4B, configured in accordance with embodiments of the present technology.

FIG. 4C illustrates a perspective view of the second side 410 of the cutting head disk 220 shown in FIGS. 4A and 4B, configured in accordance with embodiments of the present technology. In some embodiments, when the cutting head disks are stacked, for example, when the first side 405 of one cutting head disk 220 is stacked against the second side 410 of another cutting head disk 220 along the rotational axis R, the second side 410 covers the passageways 415, 435, 450, 460.

With reference to FIGS. 4B and 4C, in some embodiments, the cutting head disk 220 may include one or more alignment elements 485 for facilitating stacking and nesting with an adjacent cutting head disk (see FIGS. 2 and 3). The alignment elements 485 may align the adjacent cutting head disks with each other. In some embodiments, one or more of the alignment elements 485 includes a projection 485*a* extending from the base portion 400 or a recess 485*b* extending into the base portion 400. In some embodiments, each of one or more of the alignment elements 485 may include both a projection 485*a* and a recess 485*b*. In some embodiments, each recess 485*b* extends into a projection 485*a* and is inside the projection 485*a*. Recesses 485*b* of one cutting head disk 220 may receive projections 485*a* of an adjacent cutting head disk 220 to facilitate stacking and alignment of the two adjacent cutting head disks 220.

In some embodiments, one or more of the alignment elements 485 may have a different shape than one or more other alignment elements 485 to help "key" corresponding alignment elements 485 on adjacent cutting head disks 220 with each other so they are oriented consistently relative to the axis R. In some embodiments, as illustrated in FIGS. 4B and 4C, two alignment elements 485 are generally circular, and two alignment elements 485 are generally oblong or oval-shaped. Other embodiments may include alignment elements 485 with other suitable shapes.

In some embodiments, the cutting head disk 220 may include a central opening 490 for receiving the driveshaft 210, to facilitate stacking the cutting head disks 220 along the axis R and for transmitting torque and rotation from the driveshaft 210 to the cutting head disks 220. In some embodiments, the central opening 490 may include one or more keyways 490*a* positioned to receive one or more corresponding keys or splines on the driveshaft 210. A key or spline may include, for example, a flange extending lengthwise along at least a portion of the driveshaft 210 that is positionable in the keyway 490*a*. In some embodiments, at least a portion of the central opening 490 or the keyway 490*a* may be formed by (e.g., encircled or surrounded by) a central wall 475*c* extending from the base portion 400. Such a central wall 475*c* may reinforce the cutting head disk 220 where it engages the driveshaft 210.

When stacked, the first side 405 of one of the cutting head disks 220 may contact the second side 410 of an adjacent cutting head disk 220 (e.g., in a manner similar to the stacked cutting head disks 219 shown in FIGS. 2 and 3). The cutting head disks 220 may be oriented such that either the first sides 405 face upwards as top sides, or the first sides 405 face downwards as bottom sides. The cutting head disks 220 may be stacked, and the passageways can receive the cutting line 125, in either orientation.

Figure 5:
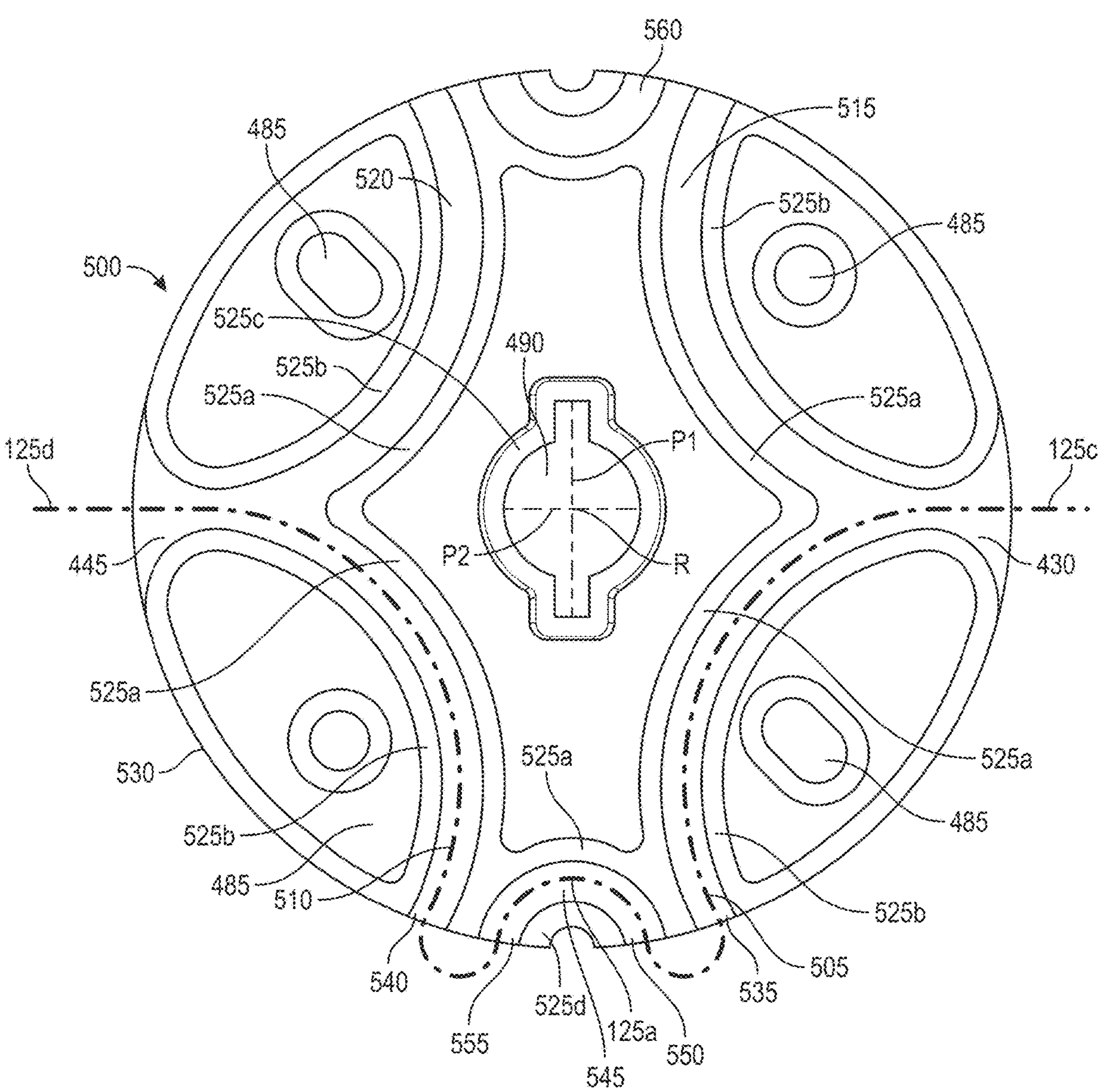
FIG. 5 illustrates a plan view of a first side of a cutting head disk, configured in accordance with further embodiments of the present technology.

FIG. 5 illustrates a plan view of first side of a cutting head disk 500 configured in accordance with further embodiments of the present technology. As is understood from viewing FIG. 5, the cutting head disk 500 may be similar to the cutting head disk 220 described above with regard to FIGS. 4A-4C, and it may be implemented in machines in the same or similar ways as the cutting head disks 219, 220 described above with regard to FIGS. 2 and 3.

For example, the cutting head disk 500 may include: one or more (e.g., four) passageways 505, 510, 515, 520, which may be similar to the passageways 415, 435, 450, 460 described above, respectively; one or more walls 525*a*, 525*b*, 525*c*, several of which may be similar to the walls 475*a*, 475*b*, 475*c* described above, respectively; one or more alignment elements 485; the central opening 490; or the outlet openings (e.g., the second opening 430 and the fourth opening 445).

In some embodiments, the cutting head disk may further include an additional wall 525*d* positioned adjacent to a perimeter 530 of the cutting head disk 500, between inlet openings 535, 540 (which may be generally similar to the first and third openings 420, 440 described above, respectively). One of the interior walls 525*a* may be spaced apart from, and parallel to, the additional wall 525*d* along at least part of its length. The additional wall 525*d* and the interior wall 525*a* form a fifth passageway 545 between two additional openings 550, 555 in the perimeter 530. The fifth passageway 545 may extend or diverge inwardly toward the axis R from each of the two additional openings 550, 555 (e.g., the fifth passageway 545 may curve away from the perimeter 530). The two additional openings 550, 555 may have reflective symmetry with each other relative to the plane P1, and each of the two additional openings 550, 555 may be between the inlet openings 535, 540.

In some embodiments, the cutting line 125 may be routed through the cutting head disk 500 in a manner similar to the way it is routed through the cutting head disk 220 described above with regard to FIGS. 4A-4C (e.g., into the inlet openings 535, 540 and out of the outlet openings (i.e., the second opening 430 and the fourth opening 445). However, the middle portion 125*a* of the cutting line 125 may further be routed through the fifth passageway 545 via the two additional openings 550, 555. The cutting line 125 may be retained securely in the cutting head disk 500 by friction and other forces (e.g., centrifugal forces) provided by the additional wall 525*d*. In such embodiments, there may be no need for including a node, knot, or other projection or inconsistency in the cutting line 125 (specifically in the middle portion 125*a*).

In some embodiments, the cutting head disk 500 may further include a sixth passageway 560 symmetrically opposed to, and having reflective symmetry with, the fifth passageway 545 across the plane P2, with similar openings and walls as the fifth passageway 545. The sixth passageway 560 may additionally or alternatively receive a cutting line 125 (e.g., along with the other passageways 515, 520).

With reference to FIG. 2, when cutting head disks (e.g., the cutting head disks 219, 220, 500) are stacked together, a side of one cutting head disk may meet the side of an adjacent cutting head disk at an interface, which may be deemed a split plane or a plane of engagement. Such a plane of engagement may be defined as a plane in which a surface of one cutting head disk contacts (e.g., presses against) a surface of another cutting head disk when the cutting head disks are stacked along the axis R. The plane of engagement may be orthogonal to the axis R. Two example split planes S are indicated in FIG. 2. If during operation, a cutting line 125 is able to vibrate into or be pulled into the interface (e.g., when the cutting line 125 hits an obstacle such as a fencepost or fence wire and wraps around the obstacle), the cutting line 125 may wedge the two adjacent cutting head disks apart at the interface. To prevent the cutting line 125 from entering the interface, in some embodiments, the adjacent cutting head disks may be configured to stack or mate in a manner that pushes the cutting line 125 away from the interface (e.g., away from the split plane S). FIGS. 6A-6D illustrate an example structure for keeping the cutting line 125 away from the interface or split plane S.

Figure 6A:
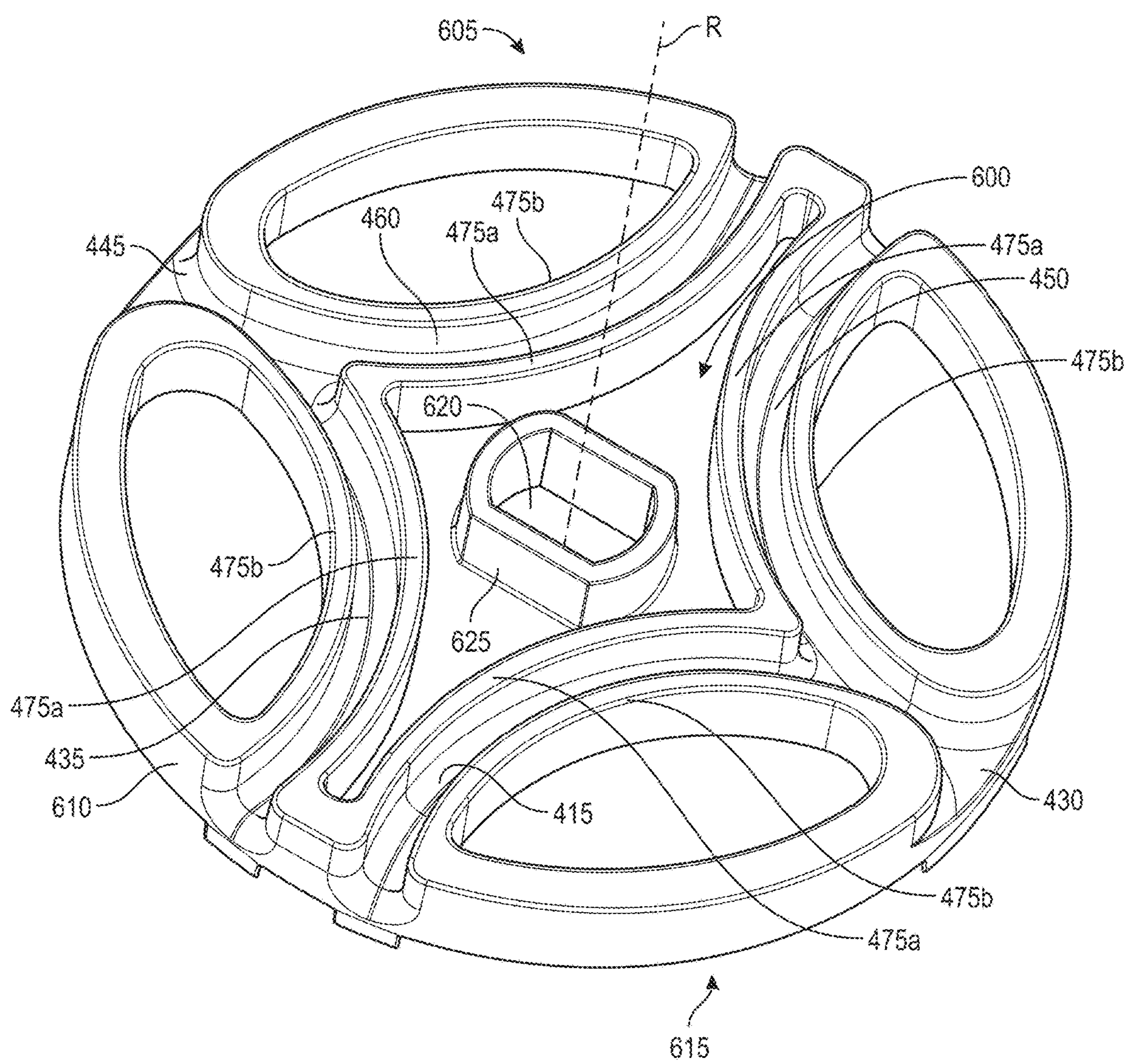
FIG. 6A illustrates a perspective view of a first side of a cutting head disk configured in accordance with additional embodiments of the present technology.

FIG. 6A illustrates a perspective view of a first side 600 of a cutting head disk 605 configured in accordance with additional embodiments of the present technology, and configured to move the cutting line away from the split plane S. As is understood from viewing FIG. 6A, the cutting head disk 605 may be similar to the cutting head disk 220 described above with regard to FIGS. 4A-4C, and it may be implemented as one or more of the cutting head disks 219 described above in the context of FIGS. 2 and 3.

For example, the cutting head disk 605 may include a base portion 610 defining the first side 600 and a second side 615 opposite the first side 600. The cutting head disk 605 may include one or more (e.g., four) passageways, such as the passageways 415, 435, 450, 460 described above, respectively; one or more walls forming the passageways, such as the walls 475*a*, 475*b* described above; a central opening 620 for receiving a rotatable shaft along the rotation axis R; or the outlet openings (e.g., the second opening 430 and the fourth opening 445).

The central opening 620 may be similar to the central opening 490 described above, or it may have a different shape, such as an elongated oval shape, with flat sides, which can engage a rotatable shaft having a similar shape to rotate the cutting head disk 605. A central wall 625 may be included to reinforce the central opening 620. The arrangement of passageways, openings, or walls may be symmetrical in a manner similar to the cutting head disks 220, 500 described above (e.g., having symmetry relative to planes bisecting the cutting head disk 605 through the rotational axis R).

In some embodiments, the cutting head disk 605 may include other features described above in connection with the cutting head disks 220, 500, such as a notch 480 (see FIG. 4B) or a fifth or sixth passageway 545, 560 with corresponding openings or walls (see FIG. 5).

Figure 6B:
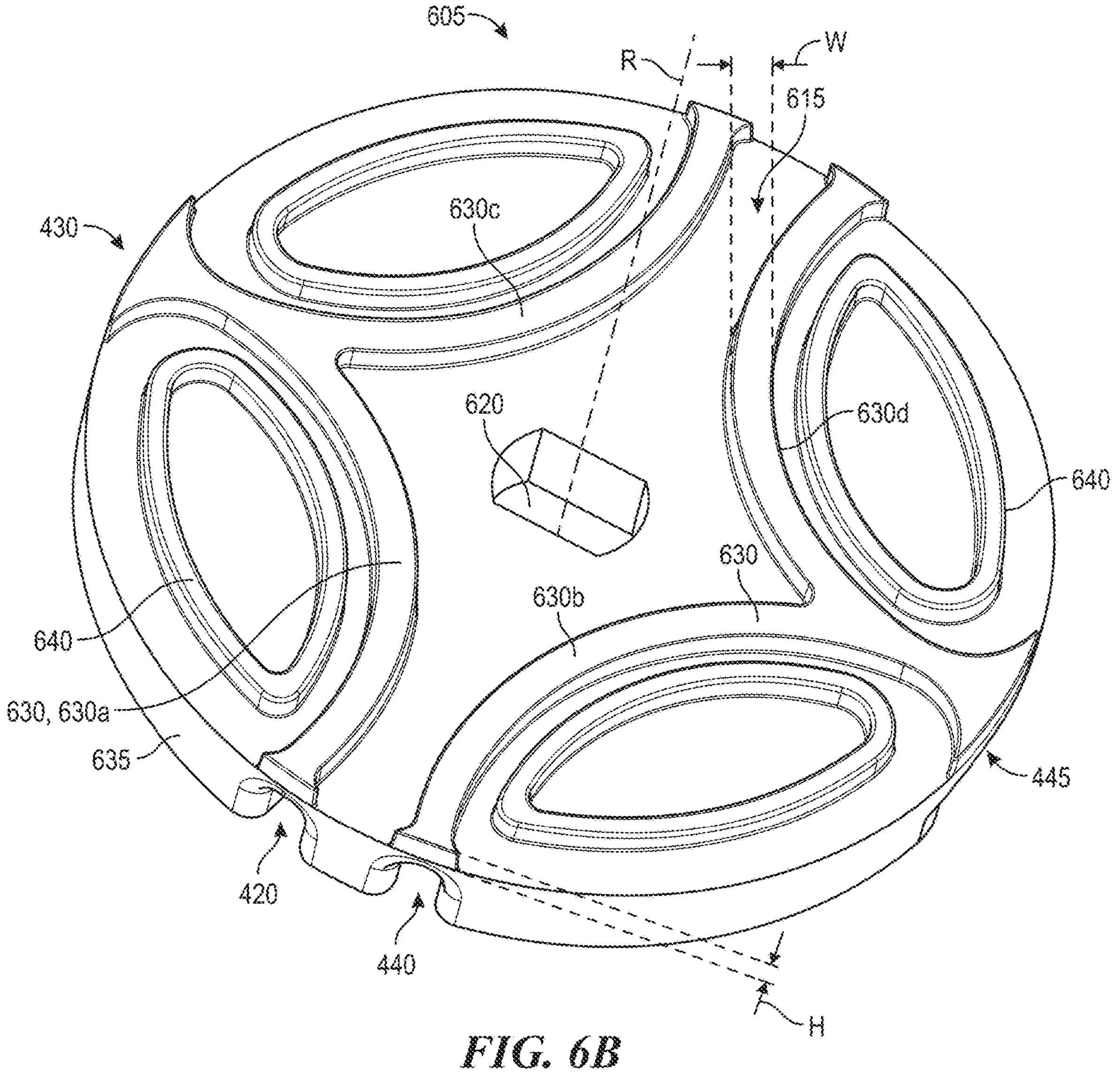
FIG. 6B illustrates a perspective view of a second side of the cutting head disk shown in FIG. 6A.

FIG. 6B illustrates a perspective view of the second side 615 of the cutting head disk 605 shown in FIG. 6A. To prevent the cutting line 125 from entering the interface between two adjacent/stacked cutting head disks 605, the cutting head disk 605 may have one or more projections 630 extending from the second side 615. The projections 630 may align with the passageways on the first side 600 (e.g., the passageways 415, 435, 450, 460), and they may be slightly narrower along a width W than the passageways so that they fit into the passageways when the first side 600 is stacked against the second side 615. In some embodiments, a gap between the width W of the projections 630 and the width of the passageways may be less than a width or thickness of a cutting line for use in the cutting head disk 605.

The projections 630 may have a height H that is less than the depth of the passageways, for example, by a difference corresponding to a thickness of a cutting line 125, or another difference suitable for confining the cutting line 125 in the passageways in a manner that spaces the cutting line 125 away from the interference or split plane S between adjoining cutting head disks 605.

In some embodiments, therefore, the projections 630 may include a first projection portion 630*a* that extends along the cutting head disk 605 from a perimeter 635 of the cutting head disk 605 at the same location along the perimeter 635 where the first opening 420 is located, toward the axis R, then it may diverge (e.g., bend or curve) away from the axis R toward a location along the perimeter 635 where the second opening 430 is located. Likewise, the projections 630 may include a second projection portion 630*b* that extends (e.g., diverges, bends, or curves) between a location at the perimeter 635 where the third opening 440 is located and a location at the perimeter 635 where the fourth opening 445 is located. The first projection portion 630*a* may be symmetrically arranged relative to the second projection portion 630*b* in the same way as the symmetrical arrangement of the first passageway 415 and the second passageway 435.

In some embodiments, two additional projection portions 630*c* and 630*d* may be symmetrically arranged relative to the first projection portions 630*a*, 630*b* in the same way as the symmetrical arrangement of the third passageway 450 and the fourth passageway 460. In general, the projections 630 may be configured to at least partially (e.g., completely) mimic the pathways of the passageways on the first side 600 such that they fill part of the passageways when the two cutting head disks 605 are stacked together (with the projections 630 in the passageways 415, 435, 450, 460).

Figures 6C, 6D:
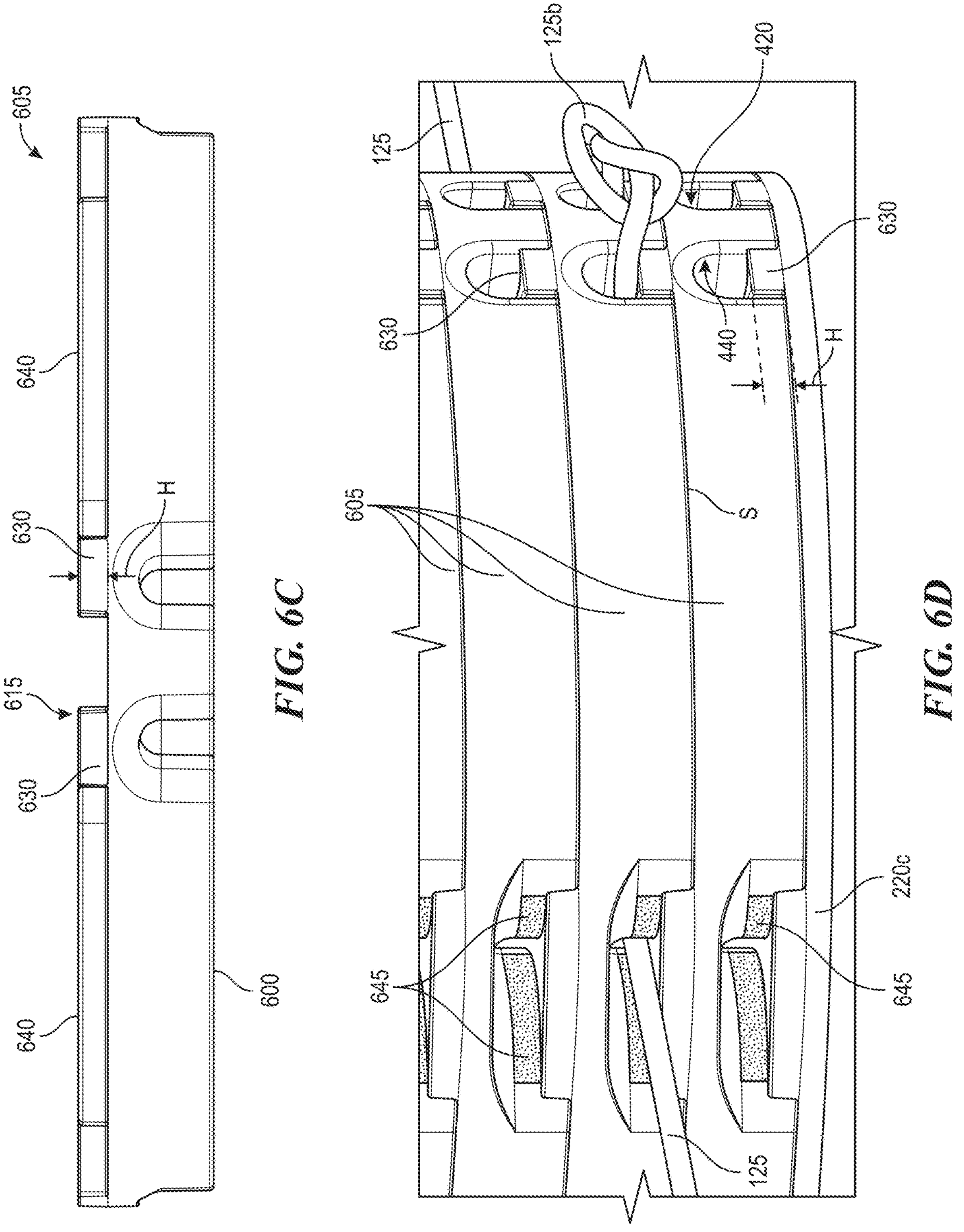
FIG. 6C illustrates a side profile view of the cutting head disk shown in FIGS. 6A and 6B.
FIG. 6D illustrates a perspective view of several cutting head disks stacked together (e.g., to form a cutting head body), with a cutting line installed in passageways of one of the cutting head disks.

FIG. 6C illustrates a side profile view of the cutting head disk 605 shown in FIG. 6A and FIG. 6B. With reference to FIGS. 6B and 6C, in some embodiments, the cutting head disk 605 may further include projections 640 that extend away from the second side 615 and are shaped or configured to engage (e.g., nest with) the outward walls 475*b* on the first side 600.

FIG. 6D illustrates a perspective view of several cutting head disks 605 stacked together (e.g., to form a cutting head body), with a cutting line 125 installed. In FIG. 6D, the projections 630 are positioned in the passageways 415, 435, as indicated by their corresponding openings 420, 440. The projections 640 push the cutting line 125 away from the split plane S between adjacent stacked cutting head disks 605, which resists (e.g., prevents) the cutting line 125 from prying the cutting head disks 605 apart from each other. The projections and passageways may also function as alignment features to help keep adjacent cutting head disks in a stack rotationally aligned with each other.

FIG. 6D also shows optional protective elements 645 over some of the surfaces within the passageways that contact the cutting line 125, to protect against wear. The protective elements 645 may include inserts or coatings such as metal materials over the underlying material forming the cutting head disks 605.

With reference to FIG. 3, in some embodiments, one or more of the cutting head disks 219 may have a thinner profile or thickness relative to other cutting head disks 219. For example, a lower cutting head disk 219*c* may be configured to be positioned as a bottom cutting head disk 219 in the cutting head body 120 adjacent to the domed bottom cover 225. The lower cutting head disk 219*c* may have features of only one side of the cutting head disks disclosed herein, for example, the lower cutting head disk 219*c* may have the projections 630, but not the passageways, or vice versa, depending on the configuration or orientation of the adjacent cutting head disk in the stack. In some embodiments, the domed bottom cover 225 may be omitted.

Specific details of several embodiments of the present technology are described herein with reference to trimmers and mowers. However, the present technology may be implemented in any suitable device or machine that involves rapidly rotating a cord or a string to carry out a cutting action. The present technology may be used in various agricultural machines (including machines for gardening or yardwork), such as wheeled trimmers, handheld trimmers, motor-driven platform trimmers or mowers, walk-behind mowers, riding mowers, or other machines.

Components of the present technology may be formed with any materials suitable for providing requisite durability. For example, components may be made with plastic materials, metal materials, composite materials, or other materials. In some embodiments, some components may include a first material while other components may include other materials. In some embodiments, components may all be made with the same material or materials. Components such as the cutting head disks may be formed by milling, molding, additive manufacturing (e.g., 3D printing), or other suitable methods. In some embodiments, the cutting head disks include a glass-filled polymer material with the optional metal inserts to reduce wear against surfaces that receive friction from the cutting line 125 or the material being cut.

Aspects of the present technology provide several advantages. In some embodiments, the only retention feature of the cutting head or cutting head disk for the cutting line may be the passageways, such that a mechanism for advancing the cutting line may be omitted. Accordingly, the present technology may simplify maintenance and installation, facilitate a reduction in parts, reduce costs, reduce weight, or other benefits. The present technology facilitates changing cutting heights without a need for tools because a user may simply push the cutting line into the passageways or pull it out of the cutting head for removal and replacement. The present technology may also reduce “weed wrap” due to the external shape of the overall cutting head bodies.

The modular nature of the cutting head disks provides several options for cutting levels or replacement of parts. In some implementations, a user may install multiple cutting lines at different cutting heights for simultaneous cutting at multiple heights. Extending the cutting line ends radially away from the rotational axis along opposite directions provides a balanced cutting head or cutting head disk. The symmetrical arrangement of the passageways further balances the cutting head or cutting head disks. The cutting head body/cutting head disks may be balanced even when only one cutting line is installed (e.g., when only two of the four passageways are used).

From the foregoing, it will be appreciated that specific embodiments of the presently disclosed technology have been described herein for purposes of illustration but that various modifications may be made without deviating from the scope of the technology. For example, some cutting head bodies may include cutting head disks that have different configurations than each other (e.g., different pathways or arrangements in the same cutting head body). In some embodiments, single parts may be formed as multiple components, or separate parts may be combined into integral components. For example, in some embodiments, cutting head disks may not necessarily be separate components joined together; multiple cutting head disks may be integrally formed to form cutting head levels in an integral structure rather than discrete/separable disks stacked together (e.g., by 3D printing or other suitable methods). In some embodiments, as generally illustrated in several of the figures, cutting head disks may be circular or at least approximately circular. In other embodiments, the cutting head disks may have other shapes when viewed from a top or bottom perspective (e.g., non-circular rounded shapes or shapes with straight edges, or other suitable shapes).

Although the technology is described in the context of a trimmer or mower with a motor, embodiments of the present technology include cutting heads, cutting-head assemblies, or other components of the present technology as individual aftermarket parts or kits of parts.

Aspects of the technology described in the context of particular embodiments may be combined or eliminated in other embodiments. Further, while advantages associated with certain embodiments of the presently disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A cutting head assembly for an agricultural machine, wherein the cutting head assembly comprises a cutting head body configured to receive and hold a cutting line, the cutting head body is rotatable about an axis, and the cutting head body comprises one or more cutting head disks arranged along the axis, wherein, for each cutting head disk of the one or more cutting head disks, the cutting head disk comprises:

(a) a base portion defining a first side and a second side opposite the first side;

(b) a first passageway along the first side, wherein the first passageway extends from a first opening at a perimeter of the cutting head disk, then toward the axis, then diverges away from the axis toward a second opening at the perimeter of the cutting head disk; and (c) a second passageway along the first side, wherein the second passageway extends from a third opening at the perimeter of the cutting head disk, then toward the axis, then diverges away from the axis and away from the second opening, toward a fourth opening at the perimeter of the cutting head disk;

wherein:

the fourth opening is opposite the second opening relative to the axis;

the first opening is positioned less than 90 degrees away from the third opening, about an arc along the perimeter of the cutting head disk; and wherein the third opening is symmetrically opposed to the first opening relative to a first plane containing the axis.

2. The cutting head assembly of claim 1, wherein the first passageway and the second passageway are defined by walls extending from the first side away from the second side, wherein the walls form sides of the passageways.

3. The cutting head assembly of claim 1, wherein, for at least one cutting head disk of the one or more cutting head disks, the at least one cutting head disk comprises:

(a) a third passageway along the first side, wherein the third passageway extends from a fifth opening at the perimeter of the cutting head disk, then toward the axis, then diverges away from the axis toward the second opening, wherein the fifth opening is symmetrically opposed to the first opening relative to a second plane containing the axis, and wherein the second plane is perpendicular to the first plane; and (b) a fourth passageway along the first side, wherein the fourth passageway extends from a sixth opening at the perimeter of the cutting head disk, then toward the axis, then diverges away from the axis and away from the second opening, toward the fourth opening, wherein the sixth opening is symmetrically opposed to the fifth opening relative to the first plane.

4. The cutting head assembly of claim 1, wherein, for at least one cutting head disk of the one or more cutting head disks, the at least one cutting head disk comprises a notch in the perimeter of the cutting head disk positioned between the first opening and the third opening, wherein the notch is configured to form a space for a user's fingers to grasp a cutting line when a cutting line is installed in the at least one cutting head disk.

5. The cutting head assembly of claim 1, wherein the one or more cutting head disks comprises a plurality of the cutting head disks.

6. The cutting head assembly of claim 5, wherein for each disk of the plurality of cutting head disks, the cutting head disk comprises one or more alignment elements positioned to align a first cutting head disk of the plurality of cutting head disks to a second cutting head disk of the plurality of cutting head disks.

7. The cutting head assembly of claim 5, wherein the plurality of cutting head disks are configured to be stacked together along a driveshaft extending along the axis, and wherein for each cutting head disk of the cutting head disks, the cutting head disk comprises at least one of:

(a) a projection extending from the base portion; or (b) a recess into the base portion.

8. The cutting head assembly of claim 7, wherein when the plurality of cutting head disks are stacked along the axis, a projection of a first cutting head disk of the plurality of cutting head disks is positioned in a recess of a second cutting head disk of the plurality of cutting head disks.

9. The cutting head assembly of claim 7, wherein for at least one cutting head disk of the plurality of cutting head disks, the recess extends into the projection.

10. The cutting head assembly of claim 5, wherein for each cutting head disk of the plurality of cutting head disks, the cutting head disk comprises a projection extending from the second side, wherein the projection of a first cutting head disk of the plurality of cutting head disks is positioned and configured to be received in the first passageway and the second passageway of a second cutting head disk of the plurality of cutting head disks when the first cutting head disk and the second cutting head disk are stacked along the axis.

11. The cutting head assembly of claim 5, wherein each cutting head disk of the plurality of cutting head disks comprises a means for positioning at least part of the cutting line away from an interface between a first cutting head disk of the plurality of cutting head disks and a second cutting head disk of the plurality of cutting head disks, along the axis.

12. The cutting head assembly of claim 1, wherein, for at least one cutting head disk of the one or more cutting head disks, the at least one cutting head disk further comprises a fifth opening at the perimeter of the cutting head disk, a sixth opening at the perimeter of the cutting head disk, and a third passageway extending between the fifth opening and the sixth opening, wherein:

the sixth opening is symmetrically opposed to the fifth opening relative to the first plane; and each of the sixth opening and the fifth opening are positioned between the third opening and the first opening along the perimeter of the cutting head disk.

13. The cutting head assembly of claim 1, wherein for each cutting head disk of the one or more cutting head disks, the cutting head disk comprises a central opening for receiving a driveshaft configured to rotate the cutting head body about the axis, wherein the axis extends through the central opening.

14. The cutting head assembly of claim 13, wherein for each cutting head disk of the one or more cutting head disks, the central opening comprises a keyway positioned to receive a key or spline on the driveshaft.

15. The cutting head assembly of claim 1, wherein the cutting head assembly comprises a domed bottom cover, wherein the one or more cutting head disks are positioned between the domed bottom cover and a gear or pulley for rotating a driveshaft extending through the one or more cutting head disks.

16. The cutting head assembly of claim 1, wherein the cutting head body does not include a mechanism for advancing a cutting line or any movable parts for advancing a cutting line.

17. The cutting head assembly of claim 1, wherein, for each cutting head disk of the one or more cutting head disks, the cutting head disk is configured to receive and hold a cutting line within one plane, wherein the cutting line extends radially outwardly from the cutting head disk from the second opening and the fourth opening, wherein a middle portion of the cutting line is positioned at the first opening and the third opening.

18. A cutting head assembly for an agricultural machine, wherein the cutting head assembly comprises a cutting head body configured to receive and hold a cutting line, the cutting head body is rotatable about an axis, and the cutting head body comprises:

a first passageway extending from a first opening at a perimeter of the cutting head body toward a second opening at the perimeter of the cutting head body; and a second passageway extending from a third opening at the perimeter of the cutting head body toward a fourth opening at the perimeter of the cutting head body;

wherein:

the first passageway diverges away from the second passageway as the first passageway extends toward the second opening and as the second passageway extends toward the fourth opening;

the fourth opening is positioned 180 degrees away from the second opening about an arc centered around the axis;

the second opening is positioned less than 90 degrees away from the first opening, about the arc;

the fourth opening is positioned less than 90 degrees away from the third opening, about the arc; and the first passageway is coplanar with the second passageway.

19. The cutting head assembly of claim 18, wherein:

between the first opening and the axis, the first passageway curves toward the axis and away from the perimeter; and between the third opening and the axis, the second passageway curves toward the axis and away from the perimeter.

20. The cutting head assembly of claim 18, further comprising:

a third passageway extending between a fifth opening and the second opening, wherein the third passageway has reflective symmetry with the first passageway relative to a plane bisecting the second opening; and a fourth passageway extending between a sixth opening and the fourth opening, wherein the fourth passageway has reflective symmetry with the second passageway relative to the plane bisecting the second opening;

wherein the third passageway and the fourth passageway are coplanar with the first passageway and the second passageway.

21. The cutting head assembly of claim 18, further comprising an opening centered around the axis and configured to receive and engage a driveshaft extending along the axis, wherein rotating the driveshaft about the axis causes rotation of the cutting head body relative to the agricultural machine.

22. The cutting head assembly of claim 18, wherein:

the first passageway is coplanar with the second passageway along a first plane orthogonal to the axis; and the cutting head body further comprises an additional first passageway and an additional second passageway, wherein the additional first passageway is coplanar with the additional second passageway along a second plane orthogonal to the axis and spaced apart from the first plane.

23. The cutting head assembly of claim 22, further comprising one or more pairs of additional first and second passageways, wherein each pair of additional first and second passageways is positioned along additional corresponding planes.

24. The cutting head assembly of claim 18, wherein the cutting head body comprises:

a first cutting head disk, wherein the first cutting head disk comprises the first passageway, the second passageway, the first opening, the second opening, the third opening, and the fourth opening; and one or more additional and separate cutting head disks, wherein each additional and separate cutting head disk is identical to the first cutting head disk.

25. The cutting head assembly of claim 24, wherein the first cutting head disk and the one or more additional and separate cutting head disks are stackable and nestable around the axis to form at least part of the cutting head body.

26. The cutting head assembly of claim 25, wherein the first cutting head disk and the one or more additional and separate cutting head disks are stackable and nestable via one or alignment elements positioned on each of the cutting head disks, wherein, for each of the cutting head disks, the one or more alignment elements comprise at least one of: (a) a projection extending from the cutting head disk or (b) a recess in a face of the cutting head disk opposite the passageways.

27. The cutting head assembly of claim 18, wherein the cutting head body comprises:

a first cutting head disk, wherein the first cutting head disk comprises the first passageway, the second passageway, the first opening, the second opening, the third opening, and the fourth opening; and a second cutting head disk, wherein the second cutting head disk comprises a projection extending along at least part of the second cutting head disk, wherein the projection is positioned and configured to be received in the first passageway, the second passageway, the first opening, the second opening, the third opening, and the fourth opening;

wherein the first cutting head disk and the second cutting head disk are configured to be stacked along the axis; and wherein when the first cutting head disk and the second cutting head disk are stacked along the axis, the projection partially extends into the first passageway, the second passageway, the first opening, the second opening, the third opening, and the fourth opening.

28. An agricultural system comprising:

a cutting head assembly comprising a cutting head body and a shaft, wherein the shaft is positionable to extend through the cutting head body along a rotational axis of the cutting head body; and a means for rotating the cutting head body about the rotational axis;

wherein:

(a) the cutting head body is configured to carry a cutting line, wherein when the cutting head assembly carries the cutting line, and the means for rotating the cutting head body rotates the cutting head body about the axis, (i) a first end portion of the cutting line extends radially away from the cutting head body and the axis along a first direction, and (ii) a second end portion of the cutting line opposite the first end portion extends radially away from the cutting head body and the axis along a second direction opposite the first direction;

(b) the cutting head body comprises a plurality of separate cutting head disks stackable together along the shaft; and (c) for each cutting head disk, the cutting head disk comprises:

(i) a first passageway extending from a perimeter of the cutting head disk, toward a radially inward portion of the cutting head disk, then diverging away from the radially inward portion of the cutting head disk toward the perimeter of the cutting head disk;

(ii) a second passageway extending from the perimeter of the cutting head disk, toward the radially inward portion of the cutting head disk, then diverging away from the radially inward portion of the cutting head disk toward the perimeter of the cutting head body, wherein the second passageway is symmetrically opposed to the first passageway relative to a first plane containing the rotational axis;

(iii) a third passageway symmetrically opposed to the first passageway relative to a second plane containing the rotational axis, wherein the second plane is perpendicular to the first plane; and (iv) a fourth passageway symmetrically opposed to the third passageway relative to the first plane and symmetrically opposed to the second passageway relative to the second plane.

29. The agricultural system of claim 28, wherein:

for each cutting head disk, the cutting head disk comprises a plurality of projections extending from a first side of the cutting head disk;

each projection forms a recess into a second side of the cutting head disk opposite the first side;

at least one of the projections has a different shape than at least one other projection; and the projections are positionable to engage the recesses of another cutting head disk.

30. A cutting head assembly for an agricultural machine, wherein the cutting head assembly comprises a cutting head body configured to receive and hold a cutting line, the cutting head body is rotatable about an axis, and the cutting head body comprises:

a first passageway extending from a first opening at a perimeter of the cutting head body toward a second opening at the perimeter of the cutting head body;

a second passageway extending from a third opening at the perimeter of the cutting head body toward a fourth opening at the perimeter of the cutting head body;

a third passageway extending between a fifth opening and the second opening, wherein the third passageway has reflective symmetry with the first passageway relative to a plane bisecting the second opening; and a fourth passageway extending between a sixth opening and the fourth opening, wherein the fourth passageway has reflective symmetry with the second passageway relative to the plane bisecting the second opening;

wherein:

the first passageway diverges away from the second passageway as the first passageway extends toward the second opening and as the second passageway extends toward the fourth opening;

the fourth opening is positioned 180 degrees away from the second opening about an arc centered around the axis;

the first passageway is coplanar with the second passageway; and the third passageway and the fourth passageway are coplanar with the first passageway and the second passageway.

* * * * *